Nov. 15, 1932. W. S. GURTON ET AL 1,887,756
RECESS LIGHT FOR MOTOR VEHICLES AND TRAILERS
Filed Feb. 12, 1931

Inventors.
William S. Gurton.
Joseph Plint.
Herman Nyberg.

Patented Nov. 15, 1932

1,887,756

UNITED STATES PATENT OFFICE

WILLIAM S. GURTON, JOSEPH PLINT, AND HERMAN NYBERG, OF KITCHENER, ONTARIO, CANADA, ASSIGNORS TO DOMINION TRUCK EQUIPMENT CO. LIMITED, OF KITCHENER, ONTARIO, CANADA

RECESS LIGHT FOR MOTOR VEHICLES AND TRAILERS

Application filed February 12, 1931. Serial No. 515,307.

The principal objects of this invention are, to provide a lighting arrangement for the corners of vehicles operating on the highways and particularly trucks, vans and trailers, whereby the outermost portion of the vehicle structure will be indicated in such a manner that it will be readily seen from the front, rear and sides of the vehicle.

A most important object is to provide a form of corner light which will not be easily damaged or put out of commission.

The principal feature of the invention consists in the novel construction of a corner bracket for the frame or body of the vehicle provided with a recess having an angularly disposed opening adapted to display a light placed therein to be visible from various angular directions.

In the accompanying drawing, Figure 1 is a perspective view of a portion of a vehicle showing the manner of application of the invention thereto.

Figure 1:
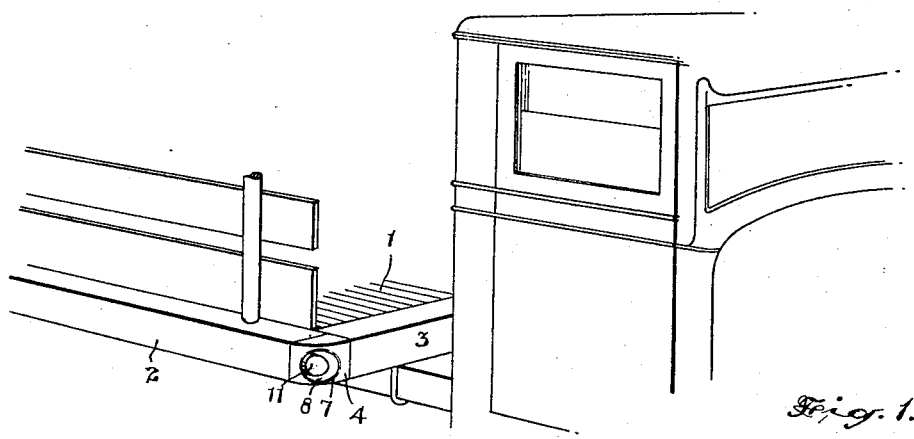
Figure 2:
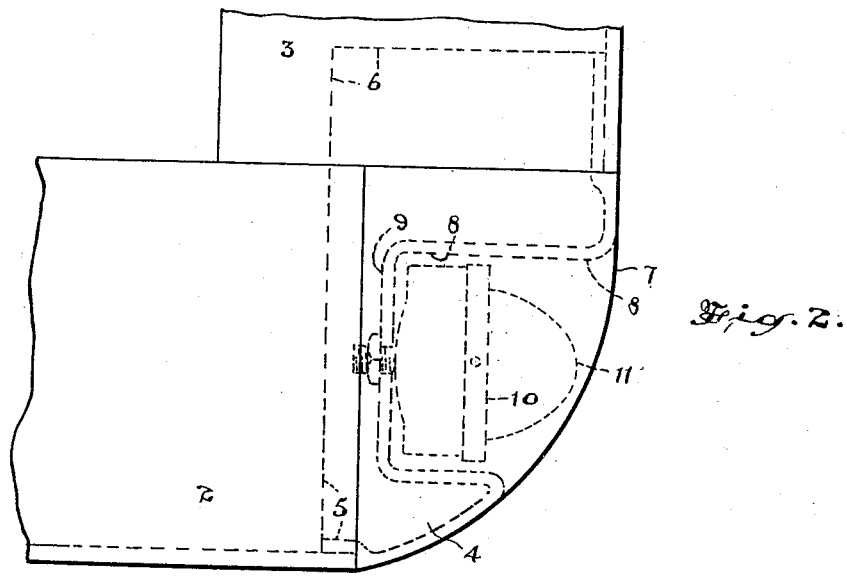
Figure 2 is an enlarged plan view of the corner of the truck frame structure showing in dotted lines the outline of the recess and lamp enclosed therein.
Figure 3:
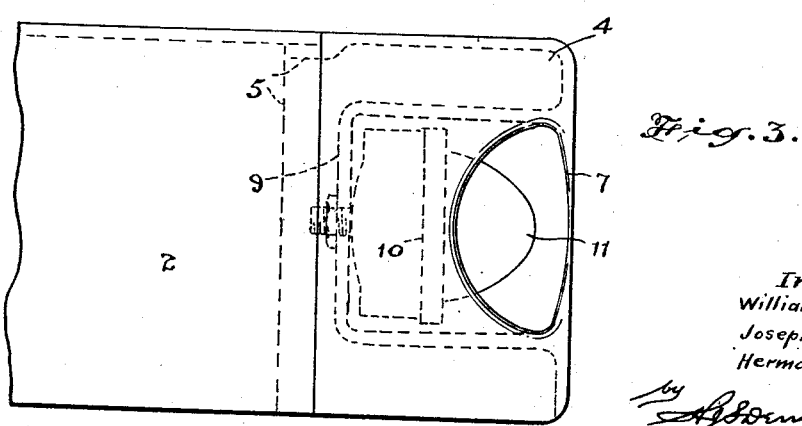
Figure 3 is a side elevational view of the structure as illustrated in Figure 2 showing the lateral visibility of the light.

It is a very well known feature in connection with highway traffic that many accidents are caused through the inability of drivers of approaching vehicles to see the portion of trucks, vans or trailer projecting laterally beyond the headlights, or when crossing a highway to determine where the back end of a vehicle may be, as usually the lights are carried on the rear end and are not visible from the side.

A further and very important object is to provide a means of lighting the corners of the vehicle in such a manner as to obviate damage to the lights in manipulating the vehicle in passageways around buildings and in other places.

In the construction herein shown the frame, body or platform 1 of the vehicle is formed with side and end bars 2 and 3 respectively. These are overlapped and are usually jointed or protected by cover plates of metal, or frequently where these side and end members are formed of metal they are joined by metal castings.

In the form herein shown the corner casting 4 is provided with flanges 5 and 6 respectively that fit within the bar structures 2 and 3 and secured therein by bolting, riveting or welding so that the corner member becomes a rigid and permanent part of the body structure.

The bracket 4 is rounded from the flanged end 5 to the flanged end 6 and in this rounded space is arranged an opening 7 which forms the outer part of a recess 8 which is of substantially cylindrical form at its inner end and is preferably closed at the inner end by the wall 9 forming part of the casting.

Any suitable form of lamp 10 is secured within the recess 8.

The lamp is preferably provided with a lens 11 which projects from the lamp casing 10 so that it will be visible in the side opening part of the recess 7.

It will be seen that as the recess is formed with an outer open end on the arc of curvature of the outer wall of the casting, the interior of the recess will be visible from the side as well as from the end, consequently a lamp mounted within the recess to project beyond the side portion of the curved opening thereto will be seen from the side and further, the inner side wall of the recess opposite the shorter side will reflect rays of light which will be visible from the side of the vehicle.

The lamp structure being housed within a recess in a heavy metal structure, will not be injured through the corner of the vehicle bumping into obstacles as the whole frame will break before the corner bracket will go and the rounded corner will sheer off an obstruction without injury to the lamp.

The device is simple. It is easily installed and it is easy to place and remove the lamp. The utilities and advantages of this construction are readily discernable and the structure is so incorporated into the body that it cannot be tampered with or removed.

What we claim as our invention is:—

1. A vehicle body having in combination convergently disposed side and end bars of flanged construction, and a metal bracket having divergently disposed flange extensions formed to interfit the flange formation of said intersecting bars and rigidly secured thereto, said bracket having a lamp housed therein between its flange extensions visible from the end and side of the vehicle.

2. A vehicle having in part side and end bars convergently disposed with a pocket therebetween, a rigid recessed bracket fitting in the pocket between the convergent ends of said bars and forming a corner piece therebetween, said bracket being formed with a divergently disposed flange formations rigidly attached to said respective side and end bars to rigidly connect and reinforce the same, and a lamp housed in said recess.

3. In a vehicle, the combination of a body having longitudinally and laterally disposed side and end beams having a corner pocket therebetween, a rigid metal bracket accommodated in said corner pocket and rigidly connected to and forming a permanent rigid connection between the respective ends of said side and end beams to form a unitary fabrication, said bracket presenting a flush rounded continuation of said side and end beams and having a bottomed recess extending inwardly from the rounded outer surface thereof, and a lamp supported by the recess bottom and enclosed within said recess.

W. S. GURTON.
JOSEPH PLINT.
HERMAN NYBERG.